(12) United States Patent
Flick (10) Patent No.: US 7,988,862 B2
(45) Date of Patent: Aug. 2, 2011

(54) TREATMENT DEVICE FOR MAGNETICALLY TREATING LIQUIDS INCLUDING DUAL FIGURINES AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 464 days.

(21) Appl. No.: 12/025,303

(22) Filed: Feb. 4, 2008

(65) Prior Publication Data
US 2008/0314253 A1 Dec. 25, 2008

Related U.S. Application Data (63) Continuation-in-part of application No. 11/765,787, filed on Jun. 20, 2007.

(51) Int. Cl.
*A23L 2/00* (2006.01)
*A23L 3/00* (2006.01)
*A63H 33/26* (2006.01)
*B01D 35/06* (2006.01)
*B03C 1/02* (2006.01)

(52) U.S. Cl. ......... 210/695; 210/222; 99/275; 99/277.1; 426/234; 426/237; 426/330.3; 426/330.4; 426/330.5; 446/139

(58) Field of Classification Search ............ 210/222, 210/695; 99/275, 277.1; 426/234, 237, 330.3, 426/330.4, 330.5; 446/139
See application file for complete search history.

(56) References Cited

U.S. PATENT DOCUMENTS

| | | | |
|---|---|---|---|
| 4,197,358 A * | 4/1980 | Garcia | 428/542.4 |
| 4,872,401 A | 10/1989 | Lee | 99/275 |
| 5,362,271 A * | 11/1994 | Butt | 446/139 |
| 5,860,353 A | 1/1999 | Ceccarani | 99/277 |
| 6,287,614 B1 | 9/2001 | Peiffer | 426/237 |
| 6,325,942 B1 | 12/2001 | Freije, III | 210/695 |
| 6,390,319 B1 | 5/2002 | Yu | 220/230 |
| 6,959,640 B2 | 11/2005 | Flick | 99/277.1 |
| 2007/0108144 A1 | 5/2007 | Flick | 211/74 |
| 2008/0314813 A1 * | 12/2008 | Flick | 210/222 |

* cited by examiner

*Primary Examiner* — David A Reifsnyder
(74) *Attorney, Agent, or Firm* — Allen, Dyer, Doppelt, Milbrath & Gilchrist, P.A.

(57) ABSTRACT

A treatment device is for magnetically treating liquid in a liquid container including a plurality of figurines configured to define a container holder to receive the liquid container. At least one permanent magnet is associated with the plurality of figurines to generate a magnetic field within the liquid in the liquid container.

28 Claims, 5 Drawing Sheets

TREATMENT DEVICE FOR MAGNETICALLY TREATING LIQUIDS INCLUDING DUAL FIGURINES AND ASSOCIATED METHODS

RELATED APPLICATION

This application is a continuation-in-part of U.S. patent application Ser. No. 11/765,787 filed Jun. 20, 2007, now allowed, the entire contents of which are incorporated herein by reference.

FIELD OF THE INVENTION

The present invention relates to the field of magnetic treatment, and more particularly, to the field of magnetically treating liquids to change properties thereof and associated methods.

BACKGROUND OF THE INVENTION

It is recognized that the flavor of some beverages may be enhanced by exposure to a magnetic field, which alters the molecular properties. U.S. Pat. No. 6,287,614 to Peiffer, for example, describes reducing the sensory perception of acids and tannins in alcoholic beverages by treating the beverage with a magnetic field. This treatment is asserted to give the alcoholic beverage a more aged flavor.

Accordingly, a number of products have been developed to expose beverages to magnetic fields to enhance flavor. Some of these products also attempt to enhance user convenience when magnetically treating beverages. For example, U.S. Pat. No. 4,872,401 to Lee discloses a container including surrounding sidewalls that have a plurality of magnets mounted on the inner side of the surrounding sidewalls to improve the flavor of fermented substances, such as wine, sauce, and tobacco. Another example is illustrated in U.S. Pat. No. 6,390,319 to Yu which discloses a beverage magnetizing container that exposes a beverage within the container to a magnetic field to promote preservation. The magnetic field is created by permanent magnets in the sidewalls, base, or cap of the container.

Other products magnetically treat beverages during initial processing. For example, U.S. Pat. No. 6,325,942 to Freije, III discloses a liquid treatment unit that includes a pipe having a plurality of magnets coupled thereto. The magnets treat liquid as it passes through the pipes. U.S. Pat. No. 5,860,353 to Ceccarani discloses an apparatus for accelerating the aging of alcoholic beverages. The apparatus exposes beverages to low-frequency polarized pulsating magnetic fields.

One shortcoming with several of these devices is that the container with its integral magnets must contact the beverage to be treated. In other words, the user must pour the beverage to be treated into the specialized container for treatment prior to consuming the beverage. These specialized containers may increase the cost of magnetically treating beverages and may also decrease consumer flexibility.

Significant advances in the area of magnetically treating materials are disclosed in U.S. Pat. Nos. 6,959,640; D511,198; D500,118; and Published U.S. Patent Application No. 2007/0108144 and assigned to Omega Patents, L.L.C., the assignee of the present invention, the entire contents of which are incorporated herein by reference. The treatment devices may be considered as having a somewhat mechanical appearance that is appealing to a wide range of users. However, other users may desire something similar in terms of effectiveness, yet more fanciful in appearance.

SUMMARY OF THE INVENTION

In view of the foregoing background, it is therefore an object of the present invention to provide a treatment device for magnetically treating liquids, that is effective yet fanciful in appearance for users.

This and other objects, features, and advantages in accordance with the present invention are provided by a treatment device for magnetically treating liquid in a liquid container comprising a plurality of figurines configured to define a container holder to receive the liquid container. At least one permanent magnet may be associated with the plurality of figurines to generate a magnetic field within the liquid in the liquid container. Accordingly, the treatment device may effectively and efficiently magnetically treat the liquid, while the plurality of figurines provide an entertaining and fanciful appearance.

At least one figurine of the treatment device may comprise a body portion and at least one limb extending outwardly therefrom to be positioned adjacent the liquid container. At least one permanent magnet may be carried by the body portion or the at least one limb. The at least one permanent magnet may comprise at least one neodymium magnet.

The at least one limb may comprise a distal end and the at least one permanent magnet may be carried by the distal end of the at least one limb. Moreover, the at least one limb may comprise a pair of arms to at least partially encircle the liquid container. The at least one limb may also comprise a pair of legs to at least partially encircle the liquid container, for example.

In some embodiments, the treatment device may further comprise a base for supporting the plurality of figurines. Also, the at least one permanent magnet may be carried by the base. The plurality of figurines may include at least one first figurine arranged in a standing position, and at least one second figurine arranged in a bending position.

Each of the figurines of the treatment device may comprise a figurine of at least one of a human and a non-human animal. For example, the figurine may comprise a dog, a bear, a monkey, an elephant, a cat, etc.

Another aspect of the invention relates to a method for making a device for magnetically treating liquid in a liquid container. The method may include configuring a plurality of figurines to define a container holder to receive the liquid container. The method may also include associating at least one permanent magnet with the plurality of figurines to generate a magnetic field within the liquid in the liquid container.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
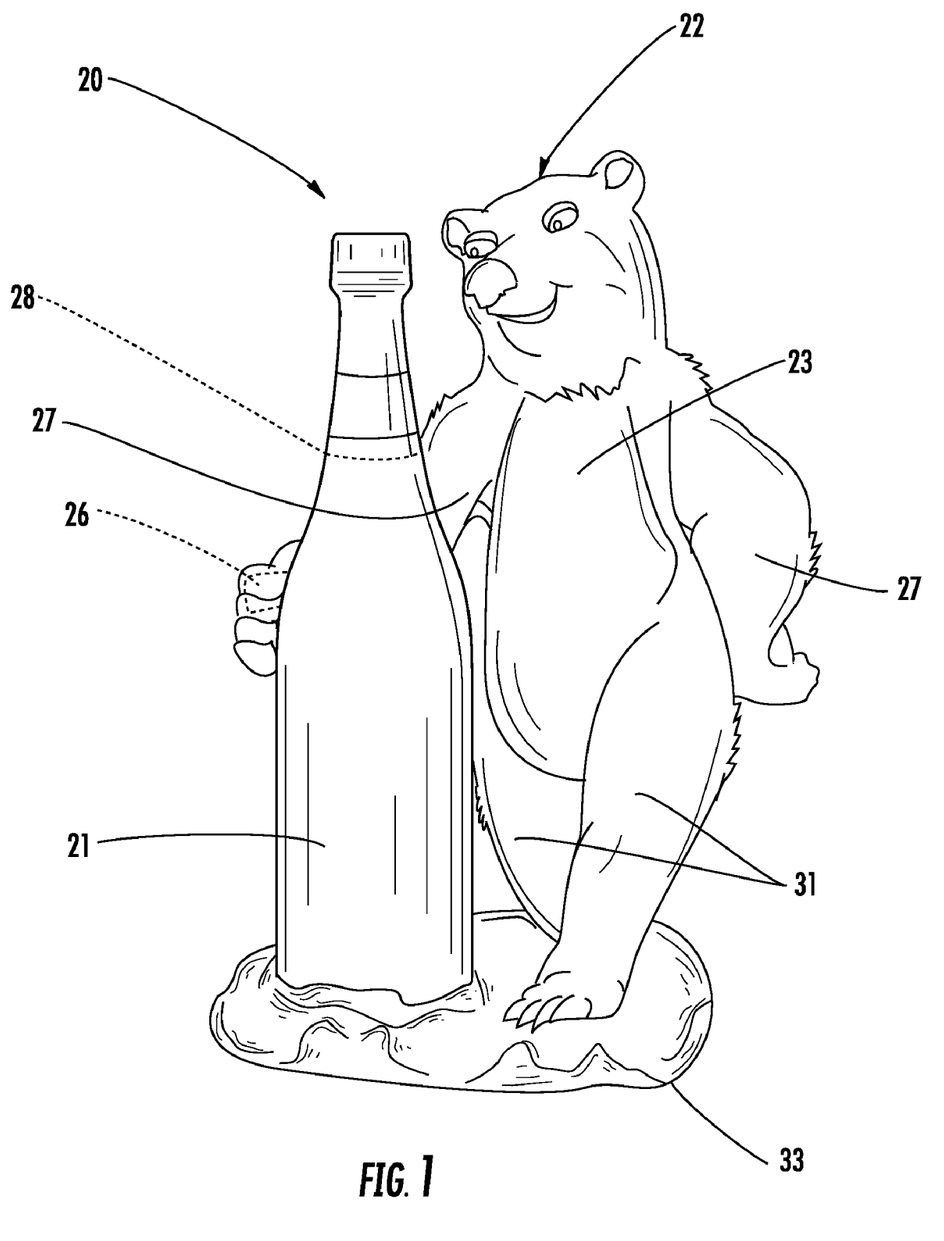
FIG. 1 is a perspective view of a treatment device for magnetically treating liquid in accordance with the present invention.

Referring initially to FIG. 1, an embodiment of a treatment device 20 for magnetically treating liquid within a liquid container 21 in accordance with the present invention is now described. The liquid fills the container 21 to the fill level indicated by reference number 28. It will be readily understood by those skilled in the art that the liquid may be a beverage, or an emollient, for example, or any other type of liquid as will be discussed in greater detail below. Additionally, in other embodiments, for example, there may be more than one liquid container 21 that can be treated simultaneously by the same treatment device 20.

The treatment device 20 comprises a figurine 22, illustratively of a bear, having a body portion 23 and four limbs, for example, extending outwardly therefrom. In other words, the figurine 22 may be of an animal and impart a fanciful appearance to the device 20 as will be appreciated by those skilled in the art.

The limbs comprise a pair of (hind) legs 31 and a pair of front legs or arms 27, each limb having a distal end. One arm 27 partially encircles the liquid container 21. A permanent magnet 26 is illustratively carried by the distal end of the arm 27 partially encircling the container 21 to expose the liquid within the liquid container 21 to a magnetic field. In this and other embodiments, the limbs could be arranged to treat two or more side-by-side liquid containers, or even liquid containers spaced from each another, as will be appreciated by those skilled in the art.

More than one magnet 26 may be carried by the distal end of the arm 27, or by any limb adjacent the liquid container 21, as will be appreciated by those skilled in the art. The permanent magnet 26 is a preferably a neodymium magnet. Other magnets having similar properties to neodymium may also be used as will be appreciated by those skilled in the art.

The liquid container 21 may, for example, be a plastic container, bottle, or any other non-ferrous container that permits the magnetic field to penetrate therethrough and into the liquid. The device 20 could be sized to accommodate any type of container, as understood by those skilled in the art. In such embodiments, the device 20 could be sized for a standard 12-ounce aluminum can, a wine bottle, a liquor bottle, a juice box, a milk carton, or any other type of beverage container as understood by those skilled in the art. In these embodiments, the device 20 may be used to enhance the flavor of alcoholic beverages, but may also be used to enhance the flavor of citrus juice and dairy products, for example. It will be understood by those skilled in the art that a beverage includes any liquid consumable substance, such as the above-referenced citrus juice, dairy products, and alcoholic beverages as well as sauces and soups, for example.

With respect to magnetically treating a liquid emollient, the characteristics of the emollient that may be changed, for example, include skin absorption and texture, as described in detail in U.S. Pat. No. 6,959,640 assigned to Omega Patents, L.L.C., the assignee of the present invention. An increase in skin absorption of the emollient may include an increase in the rate of skin absorption of the emollient into the skin of the user, for example. Also for example, an increase in skin absorption may include an increase in the amount of emollient that may be absorbed into the skin, as understood by those skilled in the art. Increasing skin absorption advantageously decreases a greasy, or oily, feel of an emollient, which may persist for some time after application, especially for emollients including lanolin.

It will be readily understood by those skilled in the art that an emollient may include any substance applied to the skin or hair for soothing or moisturizing purposes, for example. The emollient may, for example, be in the form of skin lotion, cream, cosmetic lotion, body washes, liquid soaps, cuticle oils, face care products, and hair care products, such as shampoos and conditioners, or any other type of emollient as will be understood by those skilled in the art.

The figurine 22 of the device 20 includes a body portion 32 that is vertically oriented to be laterally positioned adjacent the liquid container 21. A base 33 illustratively supports both the figurine 22 and the liquid container 21. Other embodiments may not include a base 33, and the liquid container 21 may rest on the same surface that the figurine 22 rests on, such as a table-top for example.

Figure 2:
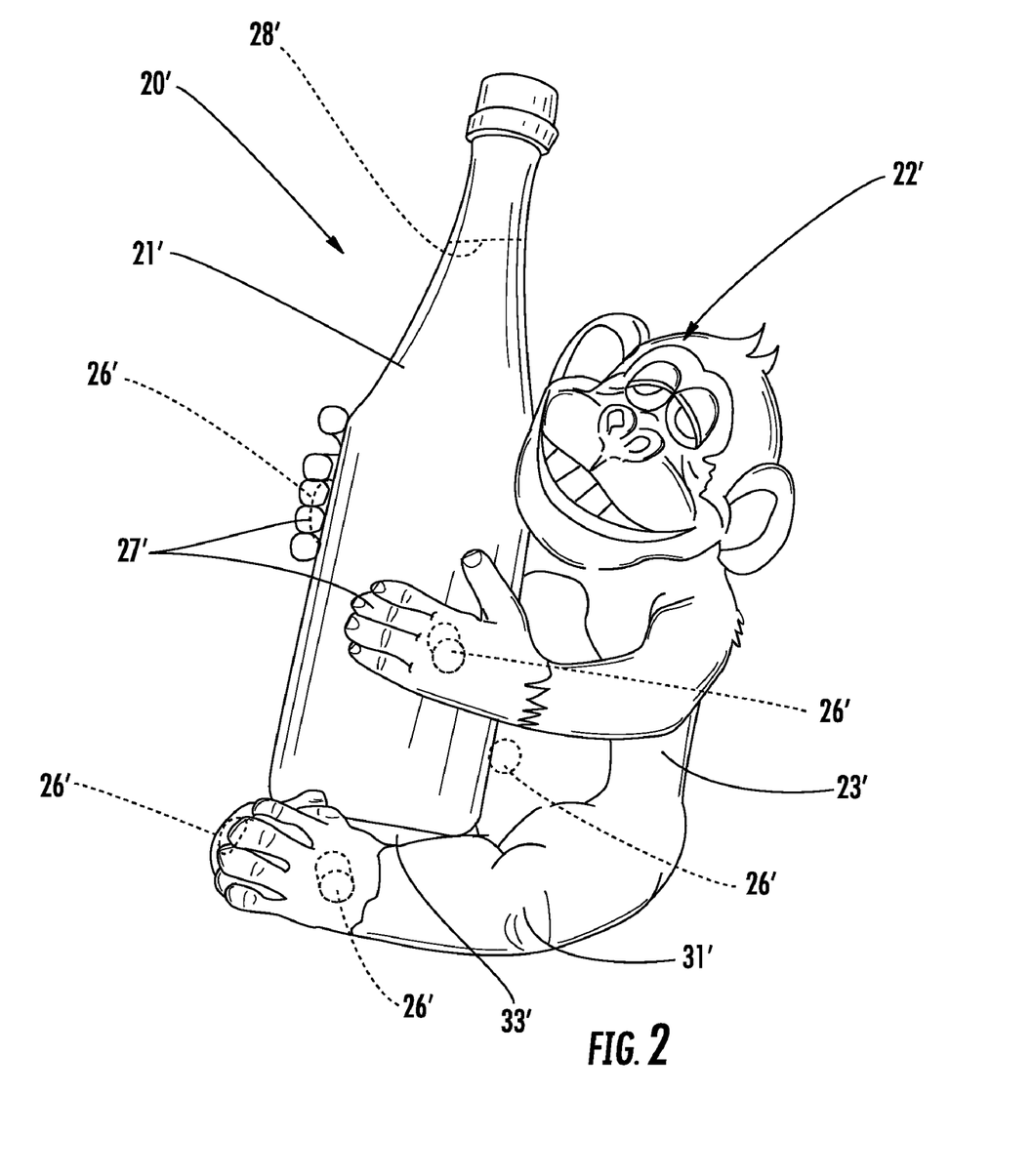
FIG. 2 is a perspective view of yet another embodiment of a treatment device for magnetically treating liquid in accordance with the present invention.

In the embodiment shown in FIG. 2, the figurine 22' is of a sitting monkey, that is, another non-human animal. In other embodiments, the figurine 22' may be of a human or another non-human animal. The limbs include a pair of arms 27' that partially encircle the liquid container 21'. The limbs also comprise a pair of legs 31' that completely encircle the liquid container 21'. In other embodiments, the limbs may comprise one or more arms, legs, or other appendages of the particular animal or human portrayed in the figurine. Of course, a limb may also include an elbow, knee, or any other portion of a limb. A permanent magnet 26' is carried by the distal end of each limb to expose the liquid within the liquid container 21' to a magnetic field. More than one magnet 26' may be carried by the distal end of each limb as will be appreciated by those skilled in the art. The distal end may include a hand, paw, finger, toe, wrist, etc. as will be appreciated by those skilled in the art. In addition, the one or more permanent magnets may be positioned in other parts of the limb than the distal end, as will also be appreciated by those skilled in the art.

Illustratively, another magnet 26' is also carried by the body portion 23' at a location adjacent the liquid container 21'. The body portion 23' may include a shoulder, hip, or other body portion. Additional magnets may advantageously be placed throughout body 23' and adjacent the liquid container 21'.

Figure 3:
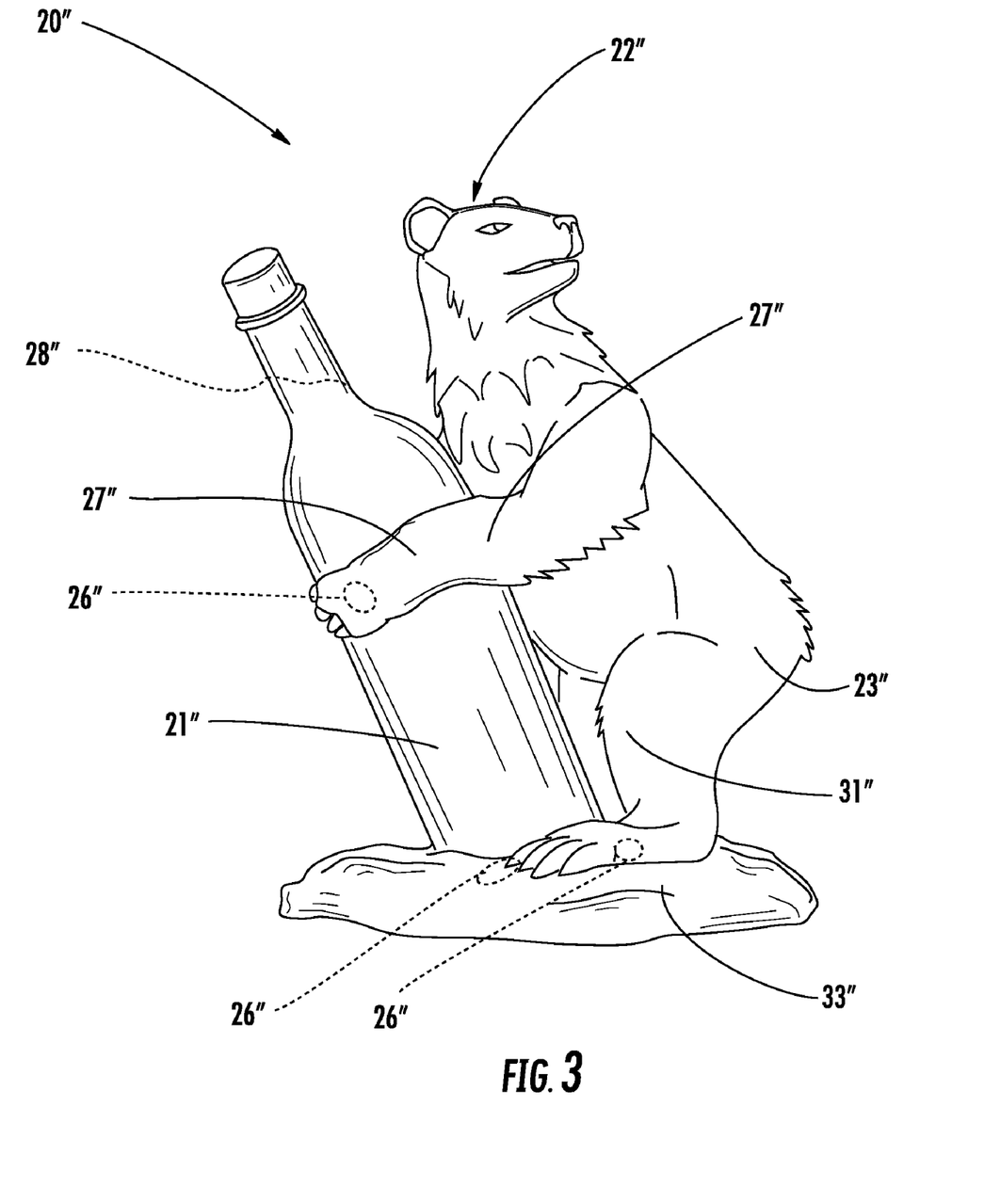
FIG. 3 is a perspective view of yet another embodiment of a treatment device for magnetically treating liquid in accordance with the present invention.

Turning now to FIG. 3, another embodiment of the device 20" is a fanciful figurine 22" of a standing and leaning bear. Illustratively, the figurine 22" includes a pair of arms 27" that encircle the liquid container 21" and a pair of legs 31" that partially encircle the liquid container 21". The arms 27" and legs 31" similarly each have distal ends positioned adjacent the liquid container 21", and a magnet 26" carried in each distal end. A base 33" supports the figurine 22" and the liquid container 21". The base 33" also has a magnet 26''' illustratively carried therein positioned to be adjacent the liquid container 21''' to expose the liquid therein to a magnetic field.

Figure 4:
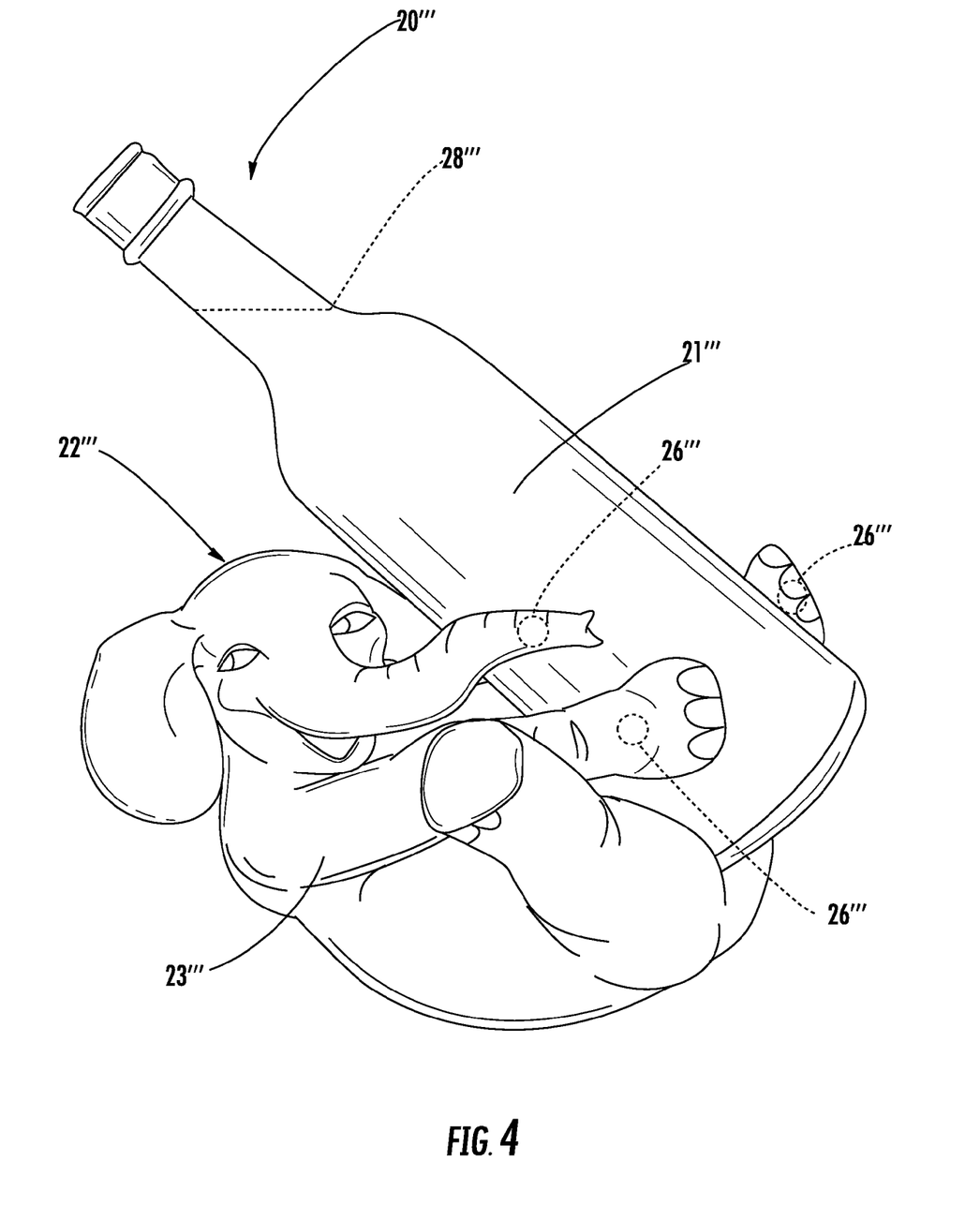
FIG. 4 is a perspective view of yet another embodiment of a treatment device for magnetically treating liquid in accordance with the present invention.

In yet another embodiment of the treatment device 20''' the figurine 22''' is an elephant as now explained with additional reference to FIG. 4. Illustratively, the elephant figurine 22''' has a body portion 23''' and limbs including two pairs, or four legs 31''', the front pair of legs 31''' partially encircling the liquid container 21''', and the other pair of rear legs 31''', splayed outwardly from the liquid container 21'''. Another limb, illustratively a trunk, is similarly positioned adjacent the liquid container 21''' and has a distal end. A permanent magnet 26''' is carried by the distal end of the front legs and the trunk, to expose the liquid within the liquid container 21''' to a magnetic field. In this embodiment, the body portion 32''' illustratively is horizontally oriented to be vertically positioned adjacent the liquid container 21'''. In other words, the body portion 32''' defines a base 33''' for receiving the liquid container 21''' thereon.

Referring again to FIG. 1, a method aspect of the invention is directed to magnetic treatment of liquid within a liquid container 21. The method includes providing a figurine 22 having a body portion 23 and at least one limb extending outwardly therefrom. The at least one limb is positioned adjacent the at least one liquid container 21. At least one permanent magnet 26 is carried by the at least one limb. The method also includes positioning the at least one liquid container 21 adjacent the figurine 22 to thereby expose the liquid within the at least one liquid container to a magnetic field.

Figure 5:
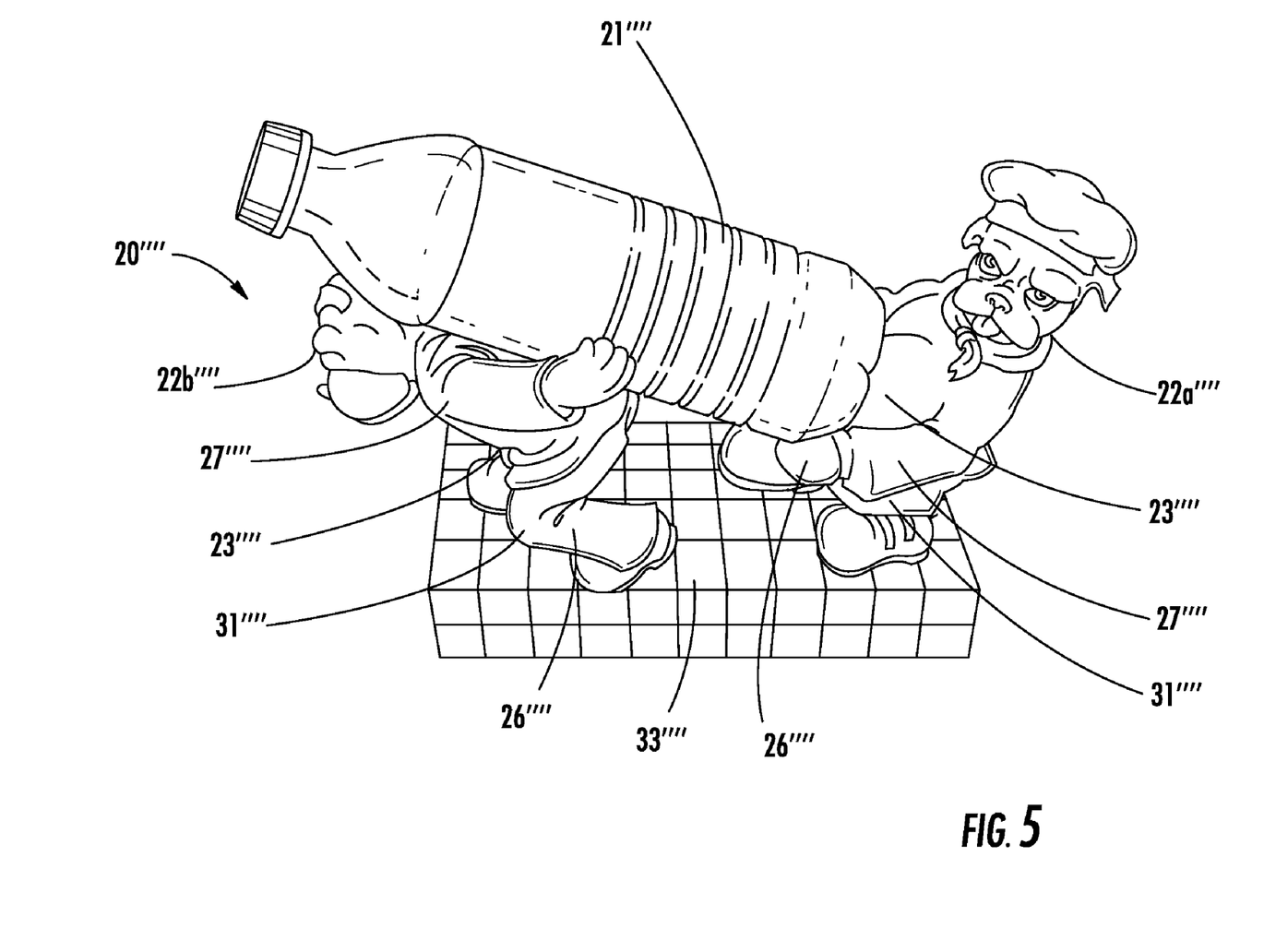
FIG. 5 is a perspective view of yet another embodiment of a treatment device for magnetically treating liquid in accordance with the present invention.

Turning now to FIG. 5, another embodiment of the device 20'''' comprises a plurality of fanciful figurines 22a'''', 22b'''' configured to define a container holder to receive the liquid container 21''''. The plurality of figurines 22a'''', 22b'''' are illustratively of dogs, having body portions 23'''' and four limbs, for example, extending outwardly therefrom.

The limbs of each figurine each comprise a pair of legs 31'''' and a pair of arms 27'''', each limb having a distal end. The arms 27'''' partially encircle the liquid container 21''''.

A permanent magnet 26'''' is illustratively carried by the distal end of the arms 27'''' partially encircling the container 21'''' to expose the liquid within the liquid container to a magnetic field. More than one magnet 26'''' may be carried by the distal end of the arms 27'''', or by any limb adjacent the liquid container 21'''', as will be appreciated by those skilled in the art. The permanent magnet 26'''' is preferably a neodymium magnet as noted above for other embodiments.

One figurine 22a'''' of the device 20'''' is arranged in a standing position, while the other figurine 22b'''' of the device 20'''' is arranged in a bending position. A base 33'''' illustratively supports both the figurines 22a'''', 22b'''' and the liquid container 21''''. The base 33'''' may be two portions each supporting a respective figurine 22a'''', 22b'''', and positioned together as shown in the illustrated embodiment. Other embodiments may not include a base 33'''', and the liquid container 21'''' may rest on the same surface that the figurines 22a'''', 22b'''' rest on, such as a table-top or counter-top.

Each of the plurality of figurines may comprise a figurine of at least one of a human and a non-human animal. In other embodiments, the figurines may be arranged in sitting, laying, walking, running, swimming, or flying positions. Some figurines may be arranged in the same position as other figurines or in a different position from the other figurines.

In yet other embodiments, the limbs may comprise a pair of hind legs or a pair of forelegs. The figurines may cooperate together to carry or operate a container, such as a wheelbarrow or wagon, which carries the liquid container.

Referring again to FIG. 5, a method aspect of the invention is directed to making a device for magnetically treating liquid in a liquid container 21''''. The method includes configuring a plurality of figurines 22a'''', 22b'''' to define a container holder 20'''' to receive the liquid container 21''''. At least one permanent magnet 26'''' is associated with the plurality of figurines 22a'''', 22b'''' to generate a magnetic field within the liquid in the container 21''''.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A treatment device for magnetically treating liquid in a liquid container comprising:
    a plurality of rigid figurines configured to define a container holder to receive and at least partially encircle the liquid container; and
    at least one permanent magnet associated with said plurality of rigid figurines to generate a magnetic field within the liquid in the liquid container.

2. A treatment device according to claim 1 wherein at least one of said plurality of rigid figurines comprises a rigid body portion and at least one rigid limb extending outwardly therefrom to be positioned adjacent the liquid container.

3. A treatment device according to claim 2 wherein said at least one permanent magnet is carried by said rigid body portion.

4. A treatment device according to claim 2 wherein said at least one permanent magnet is carried by said at least one rigid limb.

5. A treatment device according to claim 4, wherein said at least one rigid limb comprises a distal end; and wherein said at least one permanent magnet is carried by the distal end of said at least one rigid limb.

6. A treatment device according to claim 4 wherein said at least one rigid limb comprises a pair of rigid arms.

7. A treatment device according to claim 4 wherein said at least one rigid limb comprises a pair of rigid legs.

8. A treatment device according to claim 1 further comprising a base for supporting said plurality of rigid figurines.

9. A treatment device according to claim 8 wherein said at least one permanent magnet is carried by said base.

10. A treatment device according to claim 1 wherein said plurality of rigid figurines comprises at least one first rigid figurine arranged in a standing position, and at least one second rigid figurine arranged in a bending position.

11. A treatment device according to claim 1 wherein each of said plurality of rigid figurines comprises a rigid figurine of at least one of a human and a non-human animal.

12. A treatment device according to claim 1 wherein said at least one permanent magnet comprises at least one neodymium magnet.

13. A treatment device for magnetically treating liquid in a liquid container comprising:
    a plurality of rigid figurines configured to define a container holder to receive the liquid container;
    said plurality of rigid figurines comprising at least one first rigid figurine arranged in a standing position, and at least one second rigid figurine arranged in a bending position;
    at least one of said plurality of rigid figurines comprising a rigid body portion and at least one rigid limb extending outwardly therefrom to at least partially encircle and be positioned adjacent the liquid container; and
    at least one permanent magnet associated with said plurality of rigid figurines to generate a magnetic field within the liquid in the liquid container.

14. A treatment device according to claim 13 wherein said at least one permanent magnet is carried by said rigid body portion.

15. A treatment device according to claim 13 wherein said at least one permanent magnet is carried by said at least one rigid limb.

16. A treatment device according to claim 13 further comprising a base for supporting said plurality of rigid figurines.

17. A treatment device according to claim 16 wherein said at least one permanent magnet is carried by said base.

18. A treatment device according to claim 13 wherein each of said plurality of rigid figurines comprises a rigid figurine of at least one of a human and a non-human animal.

19. A treatment device according to claim 13 wherein said at least one permanent magnetic comprises at least one neodymium magnet.

20. A method for making a device for magnetically treating liquid in a liquid container, the method comprising:
   configuring a plurality of rigid figurines to define a container holder to receive and at least partially encircle the liquid container; and
   associating at least one permanent magnet with the plurality of rigid figurines to generate a magnetic field within the liquid in the liquid container.

21. A method according to claim 20 wherein at least one of the plurality of rigid figurines comprises a rigid body portion and at least one rigid limb extending outwardly therefrom to be positioned adjacent the liquid container.

22. A method according to claim 21 wherein the at least one permanent magnet is positioned to be carried by the rigid body portion.

23. A method according to claim 21 wherein the at least one permanent magnet is positioned to be carried by the at least one rigid limb.

24. A method according to claim 20 further comprising supporting the plurality of rigid figurines on a base.

25. A method according to claim 24 wherein the at least one permanent magnet is positioned to be carried by the base.

26. A method according to claim 20 wherein configuring the plurality of rigid figurines comprises configuring at least one first rigid figurine in a standing position, and at least one second rigid figurine in a bending position.

27. A method according to claim 20 wherein each of the plurality of rigid figurines comprises a rigid figurine of at least one of a human and a non-human animal.

28. A method according to claim 20 wherein the at least one permanent magnetic comprises at least one neodymium magnet.

\* \* \* \* \*

UNITED STATES PATENT AND TRADEMARK OFFICE
CERTIFICATE OF CORRECTION

| | | |
|---|---|---|
| PATENT NO. | : 7,988,862 B2 | Page 1 of 1 |
| APPLICATION NO. | : 12/025303 | |
| DATED | : August 2, 2011 | |
| INVENTOR(S) | : Flick et al. | |

It is certified that error appears in the above-identified patent and that said Letters Patent is hereby corrected as shown below:

Column 3, Line 44    Delete: "another"
                     Insert: --other--

Column 3, Line 49    Delete: "a"

Column 7, Line 14    Delete: "magnetic"
                     Insert: --magnet--

Column 8, Line 21    Delete: "magnetic"
                     Insert: --magnet--

Signed and Sealed this
Seventeenth Day of July, 2012

David J. Kappos
*Director of the United States Patent and Trademark Office*